UNITED STATES PATENT OFFICE.

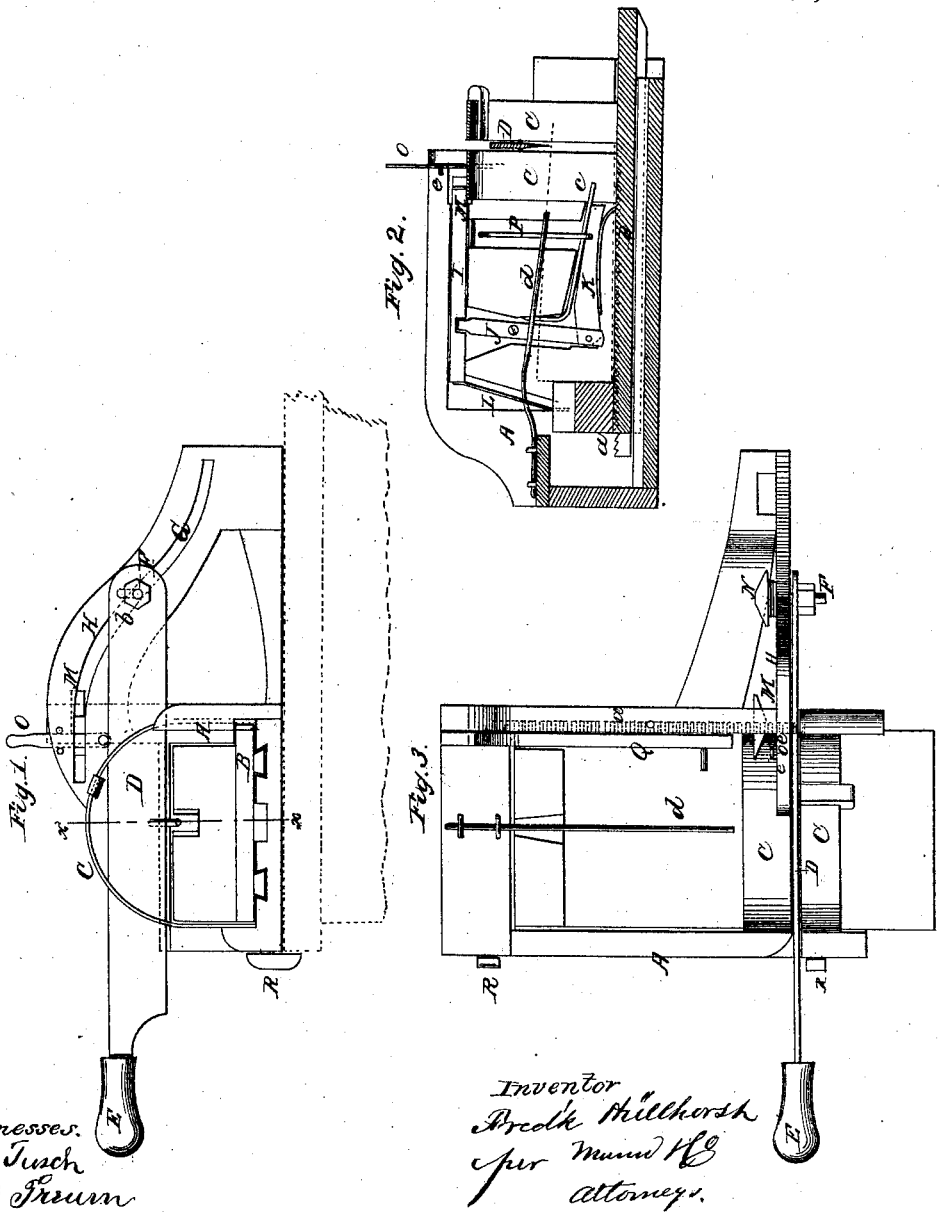

FREDERICK HÜLLHORST, OF FREEPORT, ILLINOIS.

IMPROVED BREAD-CUTTER.

Specification forming part of Letters Patent No. 46,003, dated January 24, 1865.

*To all whom it may concern:*

Be it known that I, FREDERICK HÜLL-HORST, of Freeport, in the county of Stephenson and State of Illinois, have invented a new and Improved Bread-Cutter; and I do hereby declare that the following is a full, clear, and exact description thereof, which will enable those skilled in the art to make and use the same, reference being had to the accompanying drawings, forming part of this specification, in which—

Figure 1 is a front view of my invention; Fig. 2, a vertical longitudinal section of the same, taken in the line *x x*, Fig. 1; Fig. 3, a plan or top view of the same.

Similar letters of reference indicate corresponding parts.

This invention relates to a new and improved device for cutting or slicing bread; and it consists in a novel arrangement of a knife, knife-guide, and a feeding device, all arranged in such a manner that the bread, as the knife is operated, will be fed to the latter and cut into slices of the required thickness, the knife at the same time operating with a drawing cut.

A represents a rectangular box, open at the top and at one end, and provided with a sliding bottom, B, at one side of which there is a rack, *a*. At the front or open end of the box A there are two semicircular plates, C C, with a space between them to receive a knife, D, and serve as a guide for the same. The knife D is provided at one end with a handle, E, and through its opposite end a bolt, F, passes, said bolt also passing through a curved slot, G, of cyma form, as shown clearly in Fig. 1, said slot being made in a plate, H, projecting at right angles from the box A and in line with one edge, the space between the rollers C C. The bolt F is allowed to slide freely in the slot G, and it gives as the knife is operated a proper oblique drawing-cut to it. The knife D has a straight edge, and it is lowered in order to compensate for wear by having the bolt F pass through an oblong vertical slot, *b*, in the knife, as shown in Fig. 1. One side of the box A, the side from which the slotted plate H projects, is higher than the opposite side, and it has a horizontal recess made in it near its upper edge, to receive a slide, I, (see Fig. 2,) said slide having the upper end of a lever, J, fitted in it, the lower end of the latter being pivoted to a pawl, K, which is made to engage with the rack *a* of the sliding bottom B by means of a spring, *c*. The rear end of the slide I has a spring, L, bearing against it, and the front end of said slide is provided with a short cross-head, M. A short bar, N, similar in form to the cross-head M, is on one end of the bolt F. This bar N each time the knife D is drawn back, comes in contact with the cross-head M, and actuates the slide I, the latter, through the medium of the lever J, actuating the pawl K, which moves the bottom B, on which the loaf of bread is placed. By this arrangement the bread is fed automatically under the knife D, and the thickness of the slices may be varied as desired by adjusting the bar N more or less outward on the bolt F. The spring L throws the slide I back after it has been acted upon by the bar N. To the rear of the box A there is attached an elastic rod, which serves to hold the loaf of bread in proper position, and there is a metal plate, O, pivoted to the plate H, which serves as a stop for the knife D and prevents the bar N being drawn back as far as it otherwise would be. By this means thinner slices may be cut than the bar N is adjusted for. This plate O thus acts as a stop when it is adjusted upward between pins *e e* at the side of the plate H.

In order to shove the bottom B back to its original position, the pawl K is raised free from the rack *a* by means of a rod, P, the upper end of which is bent outward, and passes through an oblong vertical slot in a plate, Q, which covers the side of the box in which the feed mechanism is placed.

I would remark that cleats or buttons R are attached to one side of the box A, to bear against the edge of the table on which the device is placed, so that the latter may be held perfectly stationary while in operation.

I claim as new and desire to secure by Letters Patent—

1. The curved slot G in the plate H, attached to box A, in connection with the knife D, arranged in connection with a slide, lever, pawl, and rack, or their equivalents, to operate the sliding bottom B, substantially as and for the purpose specified.

2. The adjustable plate O when applied to the device to operate in connection with the bar N on the bolt F of the knife D, substantially as and for the purpose set forth.

3. The guide-plates C C, in combination with the knife D and slotted plate H, for the purpose specified.

4. The adjustable bar N on the bolt F of the knife D, in connection with the cross-head M at the end of the slide I, substantially as and for the purpose set forth.

FREDERICK HÜLLHORST.

Witnesses:
  A. E. SHEPHERD,
  GEORGE WOLF.